United States Patent
Iliadis

Patent Number: 5,995,486
Date of Patent: Nov. 30, 1999

[54] FLOW CONTROL METHOD AND APPARATUS FOR CELL-BASED COMMUNICATION NETWORKS

[75] Inventor: Ilias Iliadis, Rueschlikon, Switzerland

[73] Assignee: International Business Machines Corporation, Armonk, N.Y.

[21] Appl. No.: 08/809,377

[22] PCT Filed: Sep. 17, 1994

[86] PCT No.: PCT/EP94/03133

§ 371 Date: Mar. 12, 1997

§ 102(e) Date: Mar. 12, 1997

[87] PCT Pub. No.: WO96/08899

PCT Pub. Date: Mar. 21, 1996

[51] Int. Cl.[6] .................................................. H04J 3/24
[52] U.S. Cl. ..................................... 370/229; 370/412
[58] Field of Search ................................ 370/229, 231, 370/232, 235, 236, 230, 233, 234, 252, 428, 412, 413, 414, 416, 418, 395, 389, 401, 399, 468; 395/200.01, 200.12, 200.13

[56] References Cited

U.S. PATENT DOCUMENTS

| | | | |
|---|---|---|---|
| 5,014,265 | 5/1991 | Hahne et al. | 370/236 |
| 5,197,067 | 3/1993 | Fujimoto . | |
| 5,469,545 | 11/1995 | Vanbuskirk et al. | 395/200.01 |
| 5,475,685 | 12/1995 | Garris et al. . | |
| 5,629,928 | 5/1997 | Calvignac et al. | 370/237 |

*Primary Examiner*—Dang Ton
*Attorney, Agent, or Firm*—Gerald R. Woods

[57] ABSTRACT

A flow control method is practiced in a first node in a computer network having one or more upstream nodes, each of which can provide data cells to the first node over a connection. Cells are transmitted over a connection during an established transmission period for that connection and at a data rate not exceeding a peak data rate. To determine whether a buffer is sufficient during a given time period starting at the current time, the potential buffer requirements during that time period are established as a function of the current buffer occupancy and the maximum number of cells which may be received during the given time period. If the potential buffer requirements exceed a predetermined buffer threshold, one or more stop signals is sent to upstream sources to limit the number of cells to be provided to the first node.

9 Claims, 3 Drawing Sheets

FLOW CONTROL METHOD AND APPARATUS FOR CELL-BASED COMMUNICATION NETWORKS

The invention relates to a method and an apparatus for controlling the flow of information packets or cells in a communication network. It particularly concerns a method and an apparatus to avoid congestion between two gateways or nodes of a network. More specifically, the invention relates to a flow control method and an apparatus wherein a gateway or node sends start and stop signals to an upstream gateway or node to prevent an overflow of its buffer.

BACKGROUND OF THE INVENTION

In an increasing number of communication networks, a user's information is split into cells or packets independently of whether this information contains voice, video, or data signals, i.e., multimedia traffic. An already broadly standardized by CCITT and widely accepted example for cell based communication is the asynchronous transfer mode (ATM), which is able to support multimedia traffic with its different quality of service requirements. Two basic classes of service are being considered for ATM networks: reserved traffic with a guaranteed quality of service and best-effort traffic with no explicit guaranteed service. In the case of best-effort traffic class, sources or users are expected to specify only their peak rates at connection setup. The actual transmission is then adjusted according to the feedback provided by the network. The best-effort traffic is also called "available bit-rate" (ABR) traffic being allowed to use the bandwidth remaining after serving the guaranteed traffic.

The obvious advantages of cell based communication will lead to its introduction not only into wide area networking (WAN), but can be reasonably expected to be also the basis of future regional metropolitan area networks (MANs) and customer premises networks or local area networks (LANs). The LAN traffic is connectionless and delay insensitive. Data are transmitted without a prior connection establishment and the user traffic characteristics are not specified. The available bandwidth is shared among all the active users. This type of traffic falls therefore into the best-effort traffic category. Existing LANs can be interconnected by cell based networks, for example by ATM networks using a virtual channel (VC) or virtual path connection (VPC).

The main characteristic of best effort traffic is that it is bursty and it has an unpredictable behavior. In order to support an efficient statistical sharing of bandwidth among the competing users, a congestion control mechanism is required. Several congestion control mechanisms are known, such as the sliding window being used in the TCP INTERNET protocol. In a sliding window mechanism, a sender is allowed to transmit data in a window, the size of which is either fixed or adapted to the observed network or connection conditions. As the actual window size has to be transmitted from the receiver back to the sender, the sliding window scheme belongs in its most common variants to the so-called end-to-end flow control mechanisms. These types of flow control depend on the exchange of control signals or packets from the destination back to the source node. With signal delays and data transfer rates increasing due to the evolution of global networking, end-to-end schemes are expected to deteriorate in performance and to be replaced by hop-to-hop congestion controls.

As the name "hop-by-hop" suggests, in this approach control can be exercised at each node, link, switch, or gateway along the path of the traffic stream. The new flow control mechanism is of the hop-by-hop type. It belongs to a class of feedback control schemes which operate based on simple 'stop' and 'start' signals sent from the receiving node to the transmitting or upstream node. When the transmitting node receives a 'stop' signal, it stops transmitting; it resumes transmission upon receipt of a 'start' signal. Previously presented flow control schemes of this type are triggered by the status of the buffer(s) in which the incoming cells are temporarily stored for further transmission via an outgoing port of the node. Control signals are generated if the number of stored cells exceeds or falls below predetermined thresholds. Various applications of this mechanism are for example described in:

[1] Y. T. Wang and B. Sengupta, "Performance analysis of a feedback congestion control policy under non-negligible propagation delay," *Proc. of ACM SIGCOMM '91*, pp. 149–157, September 1991.

[2] M. D. Schroeder, A. D. Birrell, M. Burrows, H. Murray, R. M. Needham, T. L. Rodeheffer, E. H. Satterthwaite, and C. P. Thacker, "Autonet: A high-speed, self-healing loacal area network using point-to-point links," *IEEE J. Select. Areas Commun.*, vol. SAC-9, no. 8, pp. 1318–1335, October 1991.

[3] J. Cherbonnier, D. Orsatti, and J. Calvignac, "Network backpressure flow control to support the best-effort service on ATM," *Contribution to the ATM Forum*, 93–1005, Stockholm, November 1993.

[4] J. Calvignac, J. Cherbonnier, I. Iliadis, J.-Y. Le Boudec and D. Orsatti, "ATM best-effort service and its management in the LAN," *Proc. EFOC&N '94*, Heidelberg, Germany, June 1994.

According to these schemes and for a given connection, the receiving node sends a 'stop' signal to the upstream node when the buffer content reaches a high-threshold H due to a cell arrival, and sends a 'start' signal when the buffer content has subsequently dropped below a low-threshold L due to a cell departure. In order to avoid losses, the buffer should be able to accommodate all the in-transit cells which are sent before the 'stop' signal arrives at the transmitting node. Therefore, these schemes require a buffer size B equal to H+r·D, where r denotes the peak transmission rate and D the round-trip propagation delay. In order to avoid starvation, i.e., a status in which the upstream node is still prevented from sending cells in the absence of any congestion, the low-threshold is selected such that the buffer can sustain a rate r for a round-trip period. Therefore, L is at least r·D. Both conditions together result in a minimum required buffer size for known flow control schemes of 2·r·D., to which further buffer space has to be added in order to increase the inertness of the control mechanism against small fluctuations of the level of the buffer occupation.

It is therefore an object of the invention to provide a hop-by-hop flow control mechanism, which has low buffer requirements and which further avoids a starvation situation in the upstream or sending nodes without adding an excessive amount of control signal (overhead) traffic to the network.

SUMMARY OF THE INVENTION

According to the invention, a flow control apparatus for cell-based traffic in a node or gateway connected to a channel having a round-trip delay D and serving at least one connection, said flow control apparatus having buffer means for storing arriving cells and backpressure means comprising signal generating means to send "start" and "stop" signals for said connection to an upstream gateway or node, said signal generating means being triggered at a time t depending on an upper limit V(t) of the number of cells potentially occupying said buffer means at a time t+D.

Referring to a first important feature of the invention, the backpressure means includes local emulator means for registering within a time interval t−D,t an "available" time in which the connection is able to transmit cells. The generation of start and stop signals denotes the beginning and the end, respectively, of an available period. The available time, i.e., the sum of all available periods within the time interval of the length D, can obviously vary from zero to D. Based on the knowledge of the available time and a predetermined (peak) transmission rate r of the connection, an upper limit for the number of cells potentially arriving at the node within said the time interval t, t+D is derived. Using further means to detect the buffer occupation N(t) at the time t and means to sum N(t) and the upper limit of arriving cells, a current value V(t) is readily determined. The time dependent function V(t), hereinafter referred to as potential function, is checked against threshold values, which can either be predetermined or alterable, as will be described below.

Known backpressure mechanisms derive an upper limit of the number of cells arriving within the next round-trip delay D by forming the product of the peak transmission rate r and the round-trip delay D, both predetermined constants. Thus, the expected number of arriving cells is treated in these known schemes simply as a constant which can be added to a current buffer content, appearing as upper threshold H. This limit is no longer treated as a constant within the scope of the invention. The invention provides a more accurate, time dependent upper limit V(t) of the number of cells potentially occupying the buffer after the period D. An accurate upper limit of arriving cells in turn enables a tighter flow control and buffer management, avoiding the generation of unnecessary start and stop signals at least to a large extent.

The concept of monitoring the available time of a single connection is extended according to the invention to a channel serving a plurality of connections or virtual channels, wherein the buffer means may comprise dedicated buffer means accessible for only one of said connections, shared buffer means accessible for several connections, or a combination of dedicated buffer and shared buffer. Whereas the first case is treated as an extension of the single-connection case described above, the second and third case involve global emulator means for controlling the constraints resulting from multiplexing and the use of a shared buffer.

In case that the peak transmission rates of each connection is unrestricted, the global emulator means registers a global available time within the interval t−D,t in which at least one of said connections is allowed to send, i.e., is in an available period. In this embodiment, the global emulator further determines an upper limit of the number of cells potentially occupying the shared buffer means.

In case of rate-controlled or rate-restricted connections, a specific type of queueing service policy (QSP) is applied at the upstream node to enforce or control the "negotiated" peak transmission rates of those rate-controlled connections. According to the invention, the QSP mechanism which is employed to enforce the predetermined peak rate at the upstream node preferably is used in a modified version in the current node: whereas the QSP in the upstream nodes polls the connections according to a defined scheme, the modified QSP in the current node, i.e., in the global emulator, polls according to said defined scheme a status register assigned to each connection within the backpressure mechanism in the current node. Thus, any given QSP can be adapted for use in determining the upper limit of arriving cells. The new global emulator is independent from any specific type of QSP mechanism.

The amount of buffer is further reduced by using a combination comprising a small dedicated buffer and large amount of shared buffer. Preferably, the ratio of dedicated buffer size to shared buffer size is within the range of 1:10 and 1:100.

For an efficient use of the combination of shared and dedicated buffer, a preferred embodiment of the invention employs variable thresholds at which start and stop signals controlling single connections are generated. In this embodiment, the threshold is altered depending on the potential shared buffer occupation.

These and other novel features believed characteristic of the invention are set forth in the appended claims. The invention itself however, as well preferred modes of use, and further objects and advantageous thereof, will best be understood by reference to the following detailed description of illustrative embodiments when read in conjunction with the accompanying drawings.

DESCRIPTION OF THE DRAWINGS

The invention is described in detail below with reference to the following drawings.

MODE(S) FOR CARRYING OUT THE INVENTION

In order to introduce basic definitions and facilitate the understanding of the new flow control, firstly, an embodiment with a single connection is described.

Figure 1:
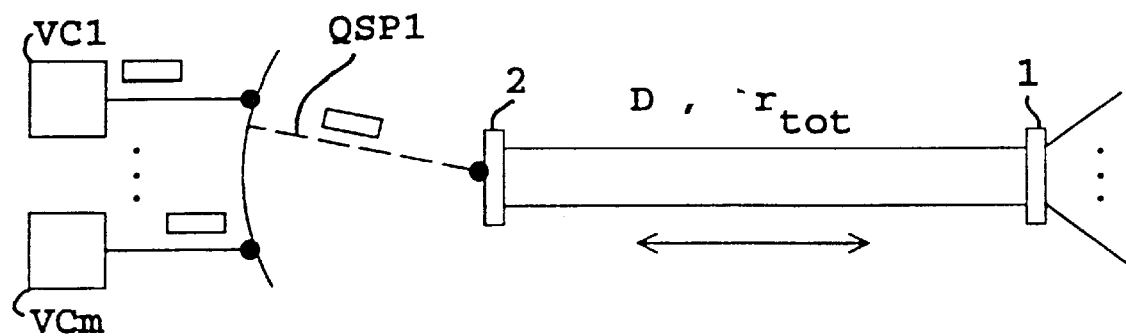
FIG. 1 shows a channel serving m connections by applying a known queueing service policy (QSP).
Figure 2:
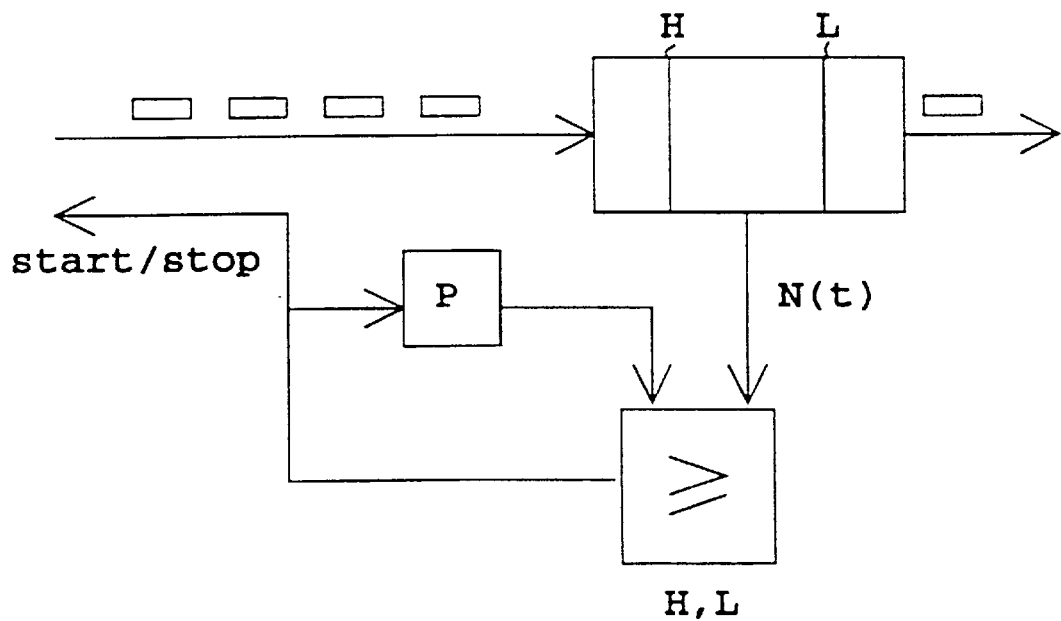
FIG. 2 shows a conventional flow control with backpressure mechanism.

Referring to FIG. 1, the (best-effort) traffic consists of cells or packets transmitted to a gateway or node 1 (referred to as the current node or simply the node) from an upstream gateway or node 2, which serves a plurality of connections VC1, . . . , VCm. The packets of these connections are multiplexed by applying a first queueing service mechanism QSP1. The transmitted cells are subsequently transmitted from the current node 1 via outgoing link(s) to at least one downstream node (not shown). For the purpose of this description, the transmission time of a cell at the outgoing link is taken as time unit (tu), so that the outgoing link has a capacity of 1 cell/tu. The upstream node is located at a distance of d tu from the node, and it can transmit best-effort traffic to the node with a peak rate of $r_{tot}$ cells/tu. The round-trip delay between the two nodes is given by D=2·d. The flow of the best-effort traffic is controlled by start and stop signals sent from the node to the upstream node, as is shown in FIG. 2. The upstream node stops the transmission of traffic upon receipt of a stop signal and resumes the transmission of traffic upon receipt of a start signal. Known mechanisms, as already described above, involve fixed thresholds H and L, the values of which are on the order of the entire buffer size B minus r·D, and r·D, respectively. As shown by FIG. 2, the number N(t) of cells stored in a buffer at a time t is compared with these thresholds H and L. Taking additionally into account the (current) status of the connection at the time t, as for example stored in a flag register P, start or stop signals are generated if these thresholds are traversed.

The signals are assumed to be carried by special control cells which contribute to an overhead traffic. For the purpose of this invention, the overhead is measured at the node as follows:

$$ov(t) = \frac{\text{number of overhead cells generated in } (0, t)}{\text{number of best-effort cells transmitted in } (0, t)}, \quad (1)$$

and a desired threshold can be set to ov. The overhead signals are sent on the reverse direction, namely from the node to the upstream node. The overhead cells reach the upstream node after a propagation delay of d tu. (under the assumption that the processing overhead associated with generating and sending the control signals is negligible. If, however, there is a signal processing time of x tu, the adjusted value of round-trip delay is given by D=2·d+x.

Referring now to the invention, the minimum buffer size avoiding starvation in the case of one connection is derived from the maximum number of arrivals which can be expected after generating a stop signal. It is equal to r·D, wherein r denotes the peak transmission rate of the connection and D is the round-trip delay. Thus, the minimum buffer requirement is given by $$B_{min} = r \cdot D. \quad (2)$$

However, to prevent small fluctuation from generating control signals, the minimum buffer size is increased by k cells. B is then given by $$B = k + B_{min} = k + r \cdot D. \quad (3)$$

where k is a small number compared to $B_{min}$. This choice implies that B is still of the order of r·D., i.e., the buffer size is halved compared to the known flow control systems.

To guarantee a lossless operation, the number N(t) of cells queued at time t in the node has to fulfill the following condition:

$$N(t) \leq B \ \forall t \geq 0. \quad (4)$$

Denoting now with $\{s_n\}$, n=1,2, ..., the instants at which stop signals are generated at the node and with $\{\tau_n\}$, n=1,2, ..., the instants at which start signals are generated at the node. These signals cause the system to alternate between periods following the generation of a start signal, and periods following the generation of a stop signal. The periods $(\tau_{n-1}, s_n)$, n=1,2, ..., are defined to be the "on" or "available" periods (with $\tau_0$=0), and the intervals $(s_n, \tau_n)$, n=1,2, ..., are defined to be the "off" or "unavailable" periods of a connection.

In the following the rules for generating the stop and start signals are derived which result in a flow control scheme that satisfies the above mentioned objectives. Firstly, the conditions are described that must be satisfied when a stop signal is triggered, i.e., more specifically, the instant $s_n$ at which a stop signal is generated, given that there were previous stop generations at the instants $\{s_j\}$, j=1,2, ..., n-1 and start generations at the instants $\{\tau_j\}$, j=1,2, ..., n-1. It is assumed that a stop signal is generated at a time t. Denoting by V(t) the maximum possible queue length after time t, under the assumption that there is no subsequent generation of a start signal, $$V(t) \equiv \sup_{\tau \geq t}\{N(\tau) \mid \text{stop at time } t \text{ without subsequent start signal}\} \quad (5)$$

should satisfy the following condition to avoid losses:

$$V(t) \leq B. \quad (6)$$

As there is no need to generate a stop signal at a time t when V(t)≦B., a stop signal is generated at the instant s, when the following condition is satisfied:

$$V(t) < B \ \forall t, \ \tau_{n-1} \leq t < s_n \text{ and } V(s_n) = B. \quad (7)$$

The function V(t) gives the queue length in the buffer, or buffer occupation which can be expected at any time in the future. The maximum possible queue length is realized under the following two conditions:

c1) the outgoing link is unavailable after time t, and
c2) the upstream node has always data to send during the time interval (t−d, t+d).

Under these conditions it holds that V(t)=N(t+d+D), the queue length at time t+D.

Defining Q(t) as the number of arrivals after time t assuming condition c2) holds, Q(t) represents an upper bound on the actual number of subsequent arrivals. Condition c1) implies that N(t+D)=N(t)+Q(t), which in turn yields, $$V(t) = N(t) + Q(t). \quad (8)$$

The quantity Q(t) can be evaluated locally at the node, based on the past history of the stop/start signals. With $T_{on}(t)$ denoting the available time, i.e., the total duration of the available periods during the interval (t−D,t), the quantity Q(t)=r·$T_{on}$(t). The evaluation of the available time $T_{on}$(t) requires the knowledge of the instants at which the stop and start signals are generated during the interval (t−D,t). In a first mode of the invention, a memory is used to store the intervals $(\tau_{n-1}, s_n)$, n=1,2, ..., defined to be the available periods within the last D time units. The time span D equals the round-trip delay of a cell. By adding the lengths of all intervals $(\tau_{n-1}, s_n)$, n=1,2, ..., the total length $T_0$ is gained. Instead of using a straight-forward adding circuit, a second mode exploits the fact that $T_{on}$ changes in a defined manner when the time advances by one unit.

Therefore the local emulator comprises further a register containing $T_{on}$ and comparator means which increase or decrease $T_{on}$ according to the conditions $$T_{on}(t+1) = T_{on}(t) + \begin{cases} +1 \text{ if } t \text{ falls into an available period} \\ -1 \text{ if } t-D \text{ falls into an available period.} \end{cases} \quad (9)$$

Both conditions are tested independently. In all other cases the available time remains unchanged. An interval $(\tau_n, s_n)$, n=1,2, ..., is deleted from the memory when its respective "stop"–time traverses the limiting time given by t−D. In this example of the invention, the available periods are stored in the memory by keeping track of two records; a record containing the instants at which start signals were generated, and a record containing the instants at which stop signals were generated during the interval (t−D,t). Alternatively, the second record may contain the duration lengths of the available periods which are initiated by the start signals associated with the first record.

The mechanism for calculating the quantity Q(t), called the local emulator, uses the peak rate r of the connection and the round-trip delay D, as parameters, and is driven by the start/stop signal process. The local emulator gives a more accurate estimation of the possible arrivals after the issuing of a stop signal than provided by known schemes employing $$Q(t)=r \cdot D. \quad (10)$$

which is an upper limit as the relation $T_{on} \leq D$ holds.

Secondly, the conditions are described that must be satisfied when a start signal is triggered, i.e., more specifically, the instant $\tau_n$ at which a stop signal is generated, given that there were previous stop generations at the instants $\{s_j\}$, j=1,2, ..., n−1 and start generations at the instants $\{\tau_j\}$, j=1,2, ..., n−1.

In the previous section, eq.(5) defined the function V(t) at time instants that belong to available periods. In the following, this definition is extended to cover the unavailable periods, too. In this case the assumption of generating a stop signal at time t is redundant, since the last generated signal was already a stop. In other words, the maximum possible queue length after time t, will be the same regardless of whether a stop signal is generated at time t, or not. The evaluation of V(t) using eq.(8) still holds, since the definition of Q(t) can also be extended to the unavailable periods. In summary, the function V(t) is called (local) potential function, representing the maximum possible buffer occupancy after the instant t, provided that the flow from the upstream node is stopped indefinitely through the generation of a stop signal at that given instant.

The conditions for generating the next start signal are based on the property of the potential function V(t) to be non-increasing with respect to the time variable t during the unavailable periods. As stated above, the start signal could be generated when the value of the potential function decreases from the value of B to the value of B−1. With regard to the decreasing property of the potential function V(t), the start signal can also be generated at any time after that instant. Advantageously, the start signal is generated if the buffer contains less than B−1 but more than r·D cells. This enables the outgoing link to sustain a transmission rate of r cells/tu and thus avoids a starvation of the connection.

An additional feature of this example allows a much tighter control of the overhead. Denoting by ov the targeted (desired) long term overhead, the generation of the start signal is allowed when, in addition to the previously defined conditions, the overhead measured by eq.(1) is less than the targeted overhead. During an unavailable or an available period, the nominator of the fraction of eq.(1) remains constant, whereas the denominator increases due to cell departures. Consequently, during any unavailable or available period the overhead is a decreasing function. However, it may well be that the overhead remains larger than the targeted overhead during some unavailable period. In this case, the start signal should be generated the latest when there is no longer a possibility of further overhead reduction. This is the moment when there is no longer a possibility of any subsequent cell departure and it is reflected by the potential function V(t) becoming zero. This condition is added to the previous conditions used for the specification of the generation of the start signal.

Based on the previous two sections, the specification of the flow control mechanism for a single connection requires the following parameters:

r: the peak rate of the connection,

D: the round-trip delay, v: a variable in case of a single connection equal to the buffer size B, and ov: the targeted overhead.

The stop signal is generated when the following condition is satisfied $$V(t) \geq v, \quad (11)$$

where V(t) is calculated using eq.(8). For reasons that will become apparent when describing the case of multiple connections, the inequality sign instead of the equality sign is used in the above relation.

Figure 3:
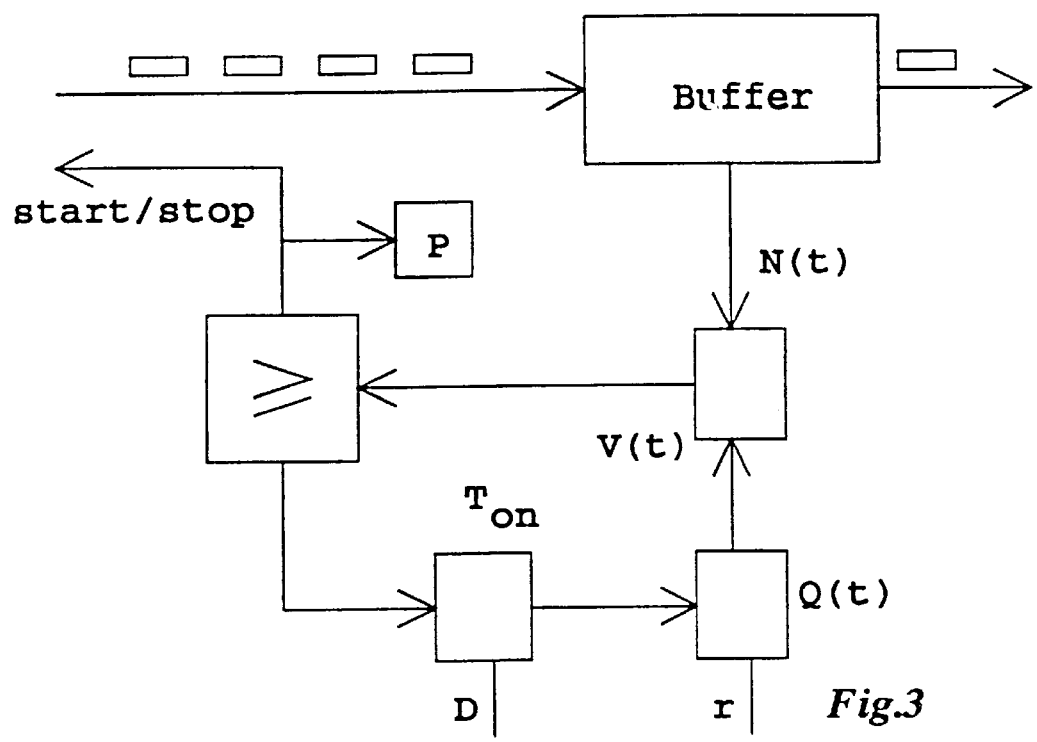
FIG. 3 shows a flow control and backpressure mechanism for a single connection in accordance with the invention.

The start signal is generated when the following conditions are satisfied:

$$V(t) \leq v-1 \ \& \ N(t) < rD \ \& \ (ov(t) \leq ov \ \text{or} \ V(t)=0), \quad (12)$$

where ov(t) is calculated using eq.(1). An implementation of the described embodiment is shown in FIG. 3.

Describing now the important case of multiple connections, wherein a link receives information traffic from several sources, i.e. several upstream nodes, with different peak transmission rates. The general case of multiple best-effort traffic connections transmitted over a reserved link or over a reserved virtual path connection (VPC) is considered. The following notation is used for the parameters known for the purpose of this invention.

m: the total number of best-effort traffic connections $r_{tot}$: the total capacity of the reserved path expressed in cells/tu, and $r_j$: the peak rate of connection j, (j=1,2, ..., m) with $$\sum_{j=1}^{m} r_j > r_{tot}. \quad (13)$$

An individual connection j can use all of the available reserved bandwidth if $r_j = r_{tot}$. This applies, for instance, in the case of a connection whose rate is not controlled.

The flow control mechanism described above for a single connection is readily applicable independently for each one of the connections, wherein a dedicated buffer $B_j$ is assigned to each of the connection. If applied independently, the resulting total buffer size $B_{tot}$ would be $$B_{tot} = \sum_{j=1}^{m} B_j.$$

which is substantially larger than the required buffer size of the following exemplary embodiment of the invention.

As compared to the case described above, a better buffer utilization is achieved by sharing a part of the available buffer among all existing connections. In the following, the buffer space shared among all the connections is denoted by $B_s$. In order to avoid deadlock problems and thus to increase the throughput of the link, a dedicated buffer of size $b_j (\geq 1)$ is provided for each connection. This value is chosen to be less than $B_j$, preferably by at least one order of magnitude. The total buffer space is given by $$B_{tot} = B_s + \sum_{j=1}^{m} b_j. \qquad (14)$$

Cells of any given connection are stored in the shared buffer only after their corresponding dedicated buffer has been filled up. It is seen as an advantage of this embodiment that, when a few congested connections occupy the shared buffer, the other connections remain able to transmit cells using their dedicated buffer portions.

For describing an example involving shared buffer means, the following definition of parameters introduced above are adapted $N_j(t)$: the queue length of connection j at the time t, $Q_j(t)$: the number of arrivals from connection j after the time t assuming that a stop signal is generated at the time t without any subsequent generation of a start signal and assuming that the upstream node has always data to send for connection j during the time interval (t–d,t+d).

$V_j(t)$: the potential function for connection j defined as $V_j(t)=N_j(t)+Q_j(t)$.

and the following definitions are newly introduced:

$H_s(t)$: the number of arrivals stored in the shared buffer after the time t assuming that a stop signal is generated for all the connections at the time t without any subsequent generation of a start signal and assuming that all the connections at the upstream node have always data to send during the time interval (t–d,t+d).

$F_s(t)$: the maximum possible total queue length in the shared buffer after the time t assuming that a stop signal is generated at time t without any subsequent generation of a start signal This function is referred to as global potential function (for a shared buffer).

The global potential function for a shared buffer is given by $$F_s(t) = \sum_{j=1}^{m} \max(0, N_j(t) - b_j) + H_s(t). \qquad (15)$$

The evaluation of $H_s(t)$ involves monitoring each dedicated buffer $b_j$ and each connection separately. An implementation, thus, requires additional circuitry which is undesired. Therefore, in an preferred mode, an upper bound $F_s^u(t)$ is introduced as:

$$F_s(t) \leq F_s^u(t) \equiv \sum_{j=1}^{m} \max(0, N_j(t) - b_j) + H(t). \qquad (16)$$

The above upper bound is derived assuming that all the incoming cells after the time t, denoted by H(t), are queued in the shared buffer. In practice however, some of these cells will flow in the dedicated buffers, provided there is still free space. This embodiment is regarded as compromising between the cost of additional logic and an efficient flow control.

Next a flow control method is derived which corresponds to the new buffer structure while maintaining the properties (lossless, no starvation, etc.) achieved above in the case of a single connection. A new feature of the shared approach is that the values $\{v_j\}$ are no longer constant, but vary in time. Initially, the value $v_j$ corresponding to connection j is taken to be equal to $B_j$, i.e., the buffer size of a single independent connection. The process according to which these values are updated is explained below.

The shared approach uses the parameter H(t) as defined above. This parameter can be obtained by considering a global emulator, which is an extension of the concept of the local emulator described above. In this example, the global emulator assumes that all connections have always data to send, and it is driven by the compounded start/stop signal process of all the connections. The global emulator is used together with the local emulators provided for each of the connections.

An implementation of the global emulator, which is used to determine the possible number H(t) of arrivals after a time t, uses flag register P(1), . . . , P(m) indicating the current status of each one of the m connections. In this example, a flag register P(j) is set to zero in case that the corresponding connection j is in an "off" or "unavailable" period, as defined above, and is set to one in an "on" or "available" period. The global emulator further comprises a shift register of D bits (D is the round-trip delay as measured in time units tu defined above). The shift register shifts by one bit per time unit, i.e. with a clock frequency of 1 when using the above defined time scale. Thus, the entire register is renewed after a period D. The shift register is fed by the output of an m-bit wide OR-gate. The inputs of the OR-gate are connected to the flag register P(1), . . . , P(m). In the case of the m connections not confined to a specific transmission rate $r_j$ (unrestricted best effort traffic), it is sufficient to clock the OR-gate with the reciprocal of the maximum transmission rate $r_{tot}$ to achieve that the number of ones in the shift register is equal to H(t). In this case of unrestricted best-effort traffic, the shift register can be replaced in another mode of the invention by a comparator and a memory to store time intervals as employed for registering the unavailable and available periods of a single connection in a local emulator. The comparator compares the output of the OR-gate at a current time t with the output at the previous time instant t–1. In case that the output changes from zero to one, the time t is registered as a (global) "start"–time and, in case that the output changes from one to zero, the time t is stored as a (global) "stop" time.

Referring now to the case in which at least one of the m connections is restricted to a transfer rate less than $r_{tot}$, (rate-controlled traffic), a mechanism QSP1 is installed at the upstream node 2 (see FIG. 1) securing that the respective connection does not exceed its predetermined transfer rate. Mechanisms to enforce a rate control are known in the art as queueing service policies (QSPs). A QSP basically controls whether any backpressure signal indicates that the connection is blocked for cell transmission and whether there are cells waiting for transmission over this connection. The monitoring of these parameters and any subsequent transmission of cells is done at a repetition rate ensuring that the respective connection remains confined to its predetermined transfer rate. Different implementations of a QSP mechanism are for example described in: M. G. H. Katevenis, "Fast Switching and Fair Control of Congestion Flow in Broadband Networks," *IEEE J. Select. Areas Commun.*, vol. SAC-5, no. 8, pp. 1315–1326, October 1987.

Figure 4:
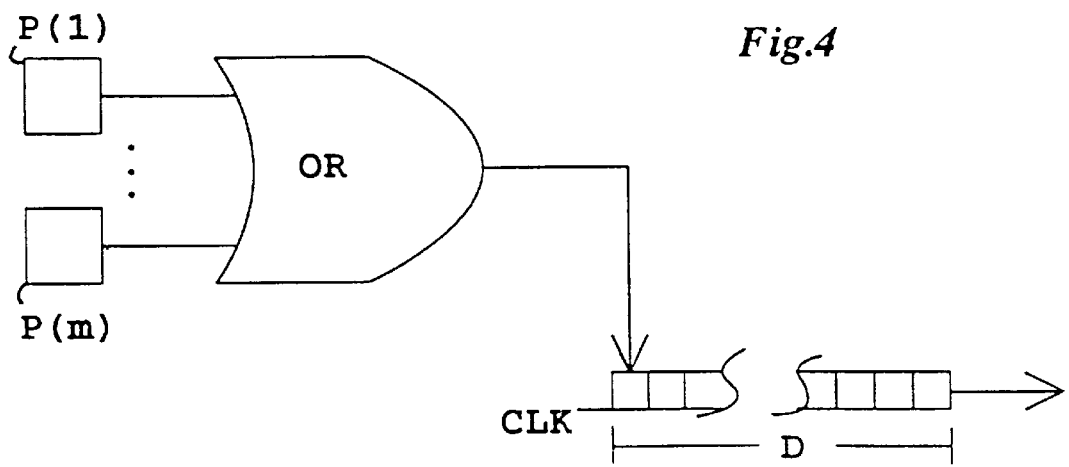
FIG. 4 shows a detail (global emulator) of a backpressure mechanism for a plurality of connections without rate control.
Figure 5:
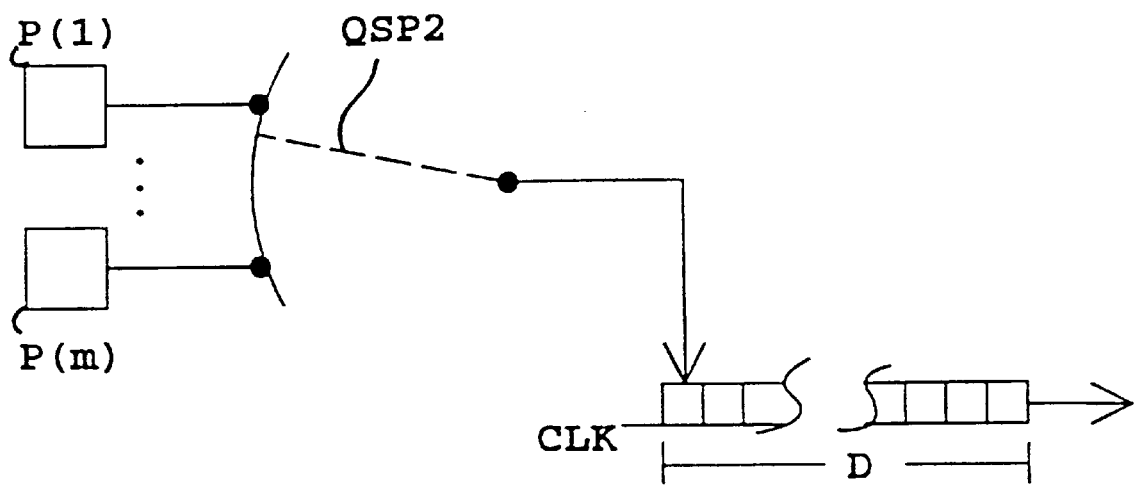
FIG. 5 shows a detail (global emulator) of a backpressure mechanism for a plurality of rate-controlled connections.

Independent of the particular type of QSP employed for rate-controlling a connection, the global emulator of this example can be adapted to rate-controlled traffic by incorporating the same type of QSP in the (current) node. However, the QSP (QSP2, see FIG. 5) applied in the node is modified with regard to the QSP (QSP1, see FIG. 1) employed in the upstream node(s) in two aspects: the check for cells awaiting transmission is skipped, and the monitoring of backpressure signals is replaced by monitoring the contents of the flag register P(1), . . . , P(m). These modifications are readily implemented for any type of QSP. The thus modified QSP replaces the OR-gate of the above described embodiment in enabling the writing to the shift register, as may also be seen by comparing FIGS. 4 and 5. As a result, the number of ones in the shift register again represents an upper limit of the maximum number of arriving cells during the period of one round-trip delay, as in case of the unrestricted traffic described above. Using the value of H(t), the upper bound $F_s''(t)$ of the global potential function can be evaluated by adding H(t) to the number N(t) of cells currently occupying the shared buffer. With the current value of the global potential function, the conditions given by the following equations (17,18) can readily be tested using appropriated adder and comparator means.

Data losses are avoided when the following condition is satisfied:

$$F_s(t) \leq B_s. \qquad (17)$$

Clearly, a sufficient but not necessary condition for eq. (17) to hold is the following, $$F_s''(t) \leq B_s. \qquad (18)$$

When $F_s''(t)$ reaches the value $B_s$, the $\{v_j\}$ values are updated. i.e., adapted to the fact that the shared buffer has the potential of being fully occupied within the next period D. This action ends the "normal phase" and starts the "reduction phase" as for each connection j, the value $v_j$ is changed from the old value $B_j$ to the much smaller new value $b_j$.

During the reduction phase, connections for which $V_j(t) < b_j$ continue to transmit data. Owing to these connections that are still allowed to transmit data, the value of $F_s''(t)$ may continue to increase beyond the value of $B_s$. An upper limit for $F_s''(t)$ is given by the necessary condition for a lossless operation, i.e., $F_s''(t) \leq B_{tot}$. The reduction phase can be terminated at any moment after $F_s''(t)$ has dropped again below $B_s$. For example, the reduction phase ends and the normal phase begins again when $F_s''(t)$ drops at the value $B_s$–thr, where thr is a threshold. The variables $\{v_j\}$ are updated again with the initial values $B_j$.

The above defined procedure ensures that the value $v_j$ for a connection j is always at least $b_j$. The connection j therefore has a minimum guaranteed throughput equal to $b_j/D$, regardless of the occupancy of the shared buffer. The desired minimum guaranteed throughput can be achieved by the appropriate choice of the dedicated buffer size.

For an efficient congestion control, following parameters are used m: the total number of best-effort traffic connections,
$r_{tot}$: the total capacity of the reserved path expressed in cells/tu,
D: the round-rip delay of the link,
$r_j$: the peak rate of connection j, (j=1,2, . . . , m).
$B_s$: the shared buffer size ($B_s > r_{tot}D$),
$b_j$: the dedicated buffer size for connection j, ($b_j \geq 1$),
$ov_j$: the targeted overhead for connection j, which can be substantially reduced by imbedding several control signals associated with various connections into one control cell instead of using one cell to control only one connection.
$B_j$: the maximum queue length for connection j, ($B_j = k_j + r_j D$),
$v_j$: a variable whose initial value is $B_j$,
thr: a threshold value.

The transition from normal phase to reduction phase is started when the following condition is satisfied.

$$F_s''(t) = B_s, \qquad (9)$$

with $F_s''(t)$ given by eq.(16). The parameters $\{v_j\}$ are updated to $v_j = b_j$, j=1,2, . . . , m. The transition from reduction phase to normal phase is started when the following condition is satisfied, $$F_s''(t) = B_s - \text{thr}. \qquad (20)$$

And the parameters $\{v_j\}$ are changed to $v_j = B_j$, j=1,2, . . . , m.

During both phases, the generation of stop and start signals for each connection is governed by the single connection flow control mechanism as defined above.

I claim:

1. For use in a computer network having a plurality of nodes, each of said nodes being directly connected to one or more upstream nodes, each of which provides data cells to one of said plurality of nodes over a connection by sending cells during transmission periods, each transmission period being initiated by a start signal and terminated by a stop signal received at the directly connected upstream node, each connection having a predetermined cell transmission rate and said node having a buffer for temporarily storing received data cells, a flow control method performed in one or more of said plurality of nodes and comprising the steps of:

determining a number of cells already occupying the buffer;

determining a maximum number of cells that may be received from directly connected upstream nodes during a future period D;

establishing a potential buffer requirement over the period D by summing the numbers of cells determined in the preceding steps; and sending a stop signal to one or more of the directly connected upstream nodes where the potential buffer requirement is greater than a known limit.

2. A flow control method as set forth in claim 1 where the number of connections is equal to one and the known limit is a predetermined percentage of the maximum capacity of the buffer.

3. A flow control method as set forth in claim 1 where the number of connections is greater than one and buffer capacity is assigned to individual connections and wherein the known limit is established as a function of the number of cells currently occupying the buffer and a summation of currently unused buffer space assigned to all of the individual connections.

4. For use in a first node in a computer network having one or more upstream nodes, each of which provides data cells to said first node over a connection by sending cells during transmission periods, each transmission period being initiated by a start signal and terminated by a stop signal received at the upstream node, each connection having a predetermined cell transmission rate and said first node having a buffer for temporarily storing received data cells, a flow control method comprising the steps of:

determining the sum of the lengths of the transmission periods occurring during an interval (t–D, t) where t is the current time and D is an interval duration;

detecting the number of cells occupying the buffer at time t;

calculating the maximum possible number of cells that could arrive during an interval (t, t+D) as a function of the sum of the current transmission periods and of a predetermined cell transmission rates of the connections;

adding the detected number of cells to the calculated maximum possible number of arriving cells to establish a possible-occupancy value for the buffer during the interval (t, t+D);

sending a stop-signal to one or more of said upstream nodes when the possible-occupancy value exceeds a known upper threshold at time t.

5. A method as set forth in claim 4 wherein the number of connections is equal to one and the known upper threshold is the capacity of the buffer.

6. A method as set forth in claim 4 wherein the number of connections is greater than 1 and known upper threshold is a function of the actual total buffer occupancy at time t plus the summation of available buffer space at time t already assigned to the connections.

7. For use in a first node in a computer network having one or more upstream nodes, each of which provides data cells to said first node over a connection by sending cells during transmission periods, each transmission period being initiated by a start signal and terminated by a stop signal received at the upstream node, each connection having a predetermined cell transmission rate and said first node having a buffer for temporarily storing received data cells, a flow control apparatus comprising:

a transmission period register in which the sum of the lengths of the transmission periods occurring during an interval (t–D, t) where t is the current time and D is an interval duration is stored;

buffer occupancy detecting logic for detecting the number of cells occupying the buffer at time t and for storing the detected number;

logic circuitry for calculating the maximum possible number of cells that could arrive during an interval (t, t+D) as a function of the sum of the transmission periods and of the predetermined cell transmission rates of the connections;

an adder in which the detected number of cells are added to the calculated maximum possible number of arriving cells to establish a possible-occupancy value for the buffer during the interval (t, t+D); and a signal generator for sending a stop-signal to one or more of said upstream nodes when the possible-occupancy value exceeds a known upper threshold at time t.

8. An apparatus as set forth in claim 7 wherein the number of connections is equal to one and the known upper threshold is the capacity of the buffer.

9. An apparatus as set forth in claim 7 wherein the number of connections is greater than one and the known upper threshold is a function of the actual total buffer occupancy at time t plus the summation of buffer space at time already assigned to but not used by the connections at time t.

* * * * *